UNITED STATES PATENT OFFICE.

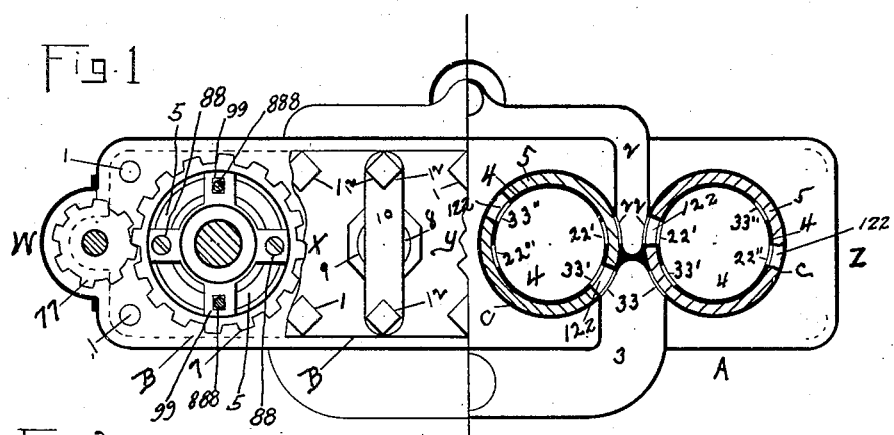

JOHN A. TOOMEY, OF LOS ANGELES, CALIFORNIA.

VALVE FOR INTERNAL-COMBUSTION ENGINES.

1,350,479. Specification of Letters Patent. Patented Aug. 24, 1920.

Application filed April 22, 1919. Serial No. 291,807.

*To all whom it may concern:*

Be it known that I, JOHN A. TOOMEY, a citizen of the United States, residing in Los Angeles, in the county of Los Angeles and State of California, have invented a new and useful Valve for Internal-Combustion Engines, of which the following is a specification.

My invention relates to four cycle internal combustion engines in which a rotating member opens and closes the intake and the exhaust ports, and the object of my invention is to provide a construction that will relieve the rotating member of all of the strain of the explosion and provide for the expansion of the various parts of the mechanism without interfering with the valve member, and providing an efficient means for the cooling and the lubricating of the mechanism.

I attain these objects with the mechanism illustrated in the accompanying drawings, in which—

Figure 1 is a plan of the mechanism.

Fig. 2 is a cross section of the valve mechanism.

Fig. 3 is detail of the cooling and lubricating system.

Similar letters and figures refer to similar parts throughout the several drawings.

The cylinder casting A is a block of four cylinders cast in one piece with all of the needed intake and exhaust passages, and follows the usual practice for such construction. A plate B is mounted on the casting A and covers all of the cylinder openings C, being raised somewhat above the casting to allow for the circulation of a cooling medium, and is made rigid with the casting A by the bolts 1. See Fig. 1, section X—Y. The cylinders C are arranged in pairs, each pair of cylinders having an intake passage 2 and an exhaust passage 3 with the ports 22 and 33 opening into the cylinders C. See Fig. 1, section Y—Z. Each cylinder C has an inserted head 4 which extends into the cylinder and is recessed from the walls thereof so that a ring or valve member 5 can be inserted between the walls of the cylinder C and the head 4. The head 4 has the compression rings 6 to close the cylinder C and prevent the leakage of gas, the head 4 is also made cone shaped and the valve 5 is ground to a perfect fit with the cone shaped head 4, and the combined head 4 and valve 5 are made a perfect fit for the cylinder C and close one end of the cylinder forming an explosion space between the head 4 and the piston P. The valve 5 is attached to the gear wheel 7 by the bolts 88 in such a manner as will allow the valve 5 to expand and contract independent of the gear 7. Any suitable construction can be used and I have shown the shank 888 of the bolt 88 which is screwed in the valve 5 as passing through a slot 99 in the gear 7 in such a manner that the bearing of the shank 888 against the gear 7 will turn the valve with the gear, the slot 99 allowing the shank 888 to move as the valve 5 expands or contracts. This also provides for variation of movement in the gear 7 so that vibrations of the gear are not transmitted to the valve 5. As detailed each valve 5 has a separate gear wheel 7 and all gears intermesh and are driven by the gear 77— see Fig. 1—W—X, which in turn is driven from the crank shaft. The details of this drive not being shown as it may follow any approved design.

The head 4 has an extension 8 which forms a bearing for the gear 7 and extends through an opening in the plate B and has the screw thread and nut 9. The nut 9 turning upon the screw thread finds a bearing against the plate B and forms a means for drawing the head 4 and valve 5 together and forcing them into a gas tight adjustment. The gear 7 finding a bearing against the under face of the plate B and controlling the valve 5. The plan of this adjustment being to bring the valve 5 and head 4 into a gas tight condition without being made so tight as to interfere with the proper expansion of the valve and head.

The extension piece 8 is capped with the cross piece 10 which has bolts 12 which extend into the plate B, the construction being designed to make the head 4 rigid with the plate B by drawing the bolts 12 tight so that nut 9 presses against the plate B and in combination with the cross piece 10 holds the extension 8 and head 4 rigid. This last adjustment being made after the head 4 valve 5 and gear 7 have been brought to a proper adjustment by turning the nut on the screw thread 9.

The head 4 has ports 22' and 33' which register with the ports 22 and 33 in the cylinder casting, and to equalize the force of the explosion on the valve 5 the head 4 has ports 22'' and 33'' cut directly opposite the ports 22' and 33' so as to expose an equal surface of the valve 5 and equalize the force of the explosion.

The valve 5 has ports 122 which register with and open and close the ports 22 and 33 as the valve rotates. As shown in the drawing the valve 5 has two ports 122 and is designed to rotate once in four revolutions of the crank shaft, each port 122 alternately opening and closing the ports 22 and 33.

In order to simplify the cooling and lubricating of this device a lubricating oil is used as a cooling medium and the several parts of the valve mechanism are placed directly in the cooling medium, in the space SS formed by the cover plate 14 which covers the mechanism and is bolted to the casting A by the bolts 15. The usual cooling space S surrounds the cylinders C and the casting A has several openings 16 to allow the circulation of the cooling medium. The oil is circulated by a pump 17 connected with the sump 24 at 30 which has a pressure valve 18 designed to open at a fixed pressure and thereby create a forced circulation which is carried by the pipe 19 to the crank bearing 20 and any other desired point. The excess oil which passes the valve 18 follows the pipe 21 to the cooling space S around the cylinders and circulates around and into the space SS until it finds the overflow pipe 23 which carries it back to the sump 24 in the crank case CC. The crank case is provided with the radiating fins 25 to aid in cooling the oil. The overflow pipe 23 is set in the cap piece 26 which has the vent 27 to allow the escape of any gas that may accumulate from the heating of the oil. In this combination it is needed to drain the recess in the head 4 and around the valve 5 so as to prevent any excess of oil at the ports 22 and 33. This is done by means of the drain 28 which opens into the recess at 29 and forms a direct passage to the crank case.

The operation of the various parts is clear from the discription given and it may here only be pointed out that when the parts are assembled the proper adjustment is made by turning the nut on the screw thread 9 and that then the adjustment is made secure and permanent by means of the cross piece 10 and the bolts 12.

Having described my invention I claim the following,

1. The combination in an internal combustion engine of a fixed cylinder casting A in which are the cylinders C, the passages 2 and 3 and the fixed ports 22 and 33, for the intake and exhaust of gas, a reciprocating piston P in each cylinder, connecting rods for the pistons, a crank shaft, a plate B bolted to said casting A, a head piece 4 extending into and closing one end of each cylinder C and recessed from the walls thereof, having the rings 6 to seal the cylinder under pressure an explosion space formed between the head 4 and the piston P, the ports 22' and 33' to register with the ports 22 and 33, and admit of the intake into and exhaust of gas from the explosion space, a rotary valve 5 ground to a gas tight fit with the head 4 and filling the recess between the head 4 and cylinder wall, said valve having the ports 122 to open and close the ports in the head 4 and the cylinder wall, the head 4 having the extension 8 which passes through the plate B, a screw thread and nut 9 on said extension piece 8, designed to draw the head 4 the rotary valve 5 and gear 7 against the plate B and secure a gas tight adjustment between the head 4 and valve 5, the cross piece 10 and the bolts 12 designed to make the head 4 rigid with the plate B and transmit the force of the explosion to the plate B, a gear wheel 7 for each valve 5 said gears intermeshing, and means for rotating said gears and valves from the crank shaft, substantially as described.

2. In an apparatus of the kind described, the combination of an internal combustion engine embodying a main cylinder casting having ports and gas passages, a crank case upon which said casting is mounted and into which it opens, an adjustable head extending into the opposite end of each cylinder, and recessed from the walls thereof, having rings whereby the cylinder is sealed under pressure, ports in said head to register with the ports in the cylinder casting, a rotary valve having ports and ground to a perfect fit in the recess between the adjustable head and the main cylinder casting, designed to open and close the ports as the valve rotates, a plate bolted to the cylinder casting to form a bearing for the valve, an adjustable screw means for adjusting the valve between the said adjustable head and the plate, means for making the head rigid with the main casting after this adjustment has been made, a piston reciprocating in the cylinder, an explosion space formed between the piston and the adjustable head, means for carbureting and means for exploding gas therein, a connection rod, a crank shaft and means for rotating the valve from the crank shaft substantially as described.

3. In an apparatus of the kind described, an internal combustion engine, having the casting A, the plate B, the head 4, the valve 5, the drain 28, the gears 7 and 77, the cross piece 10, the bolts 12, the nut and screw 9, the extension piece 8, the space SS, surrounding the said parts the space S in the casting A, the openings 16, a combined lubricating and cooling medium such as a lubricating oil filling the spaces SS and S, a crank case CC, a sump O, radiating fins 25 a vent V, and overflow pipe M, a pump 17 to circulate the cooling medium, a crank shaft and means for driving the pump from the crank shaft, in combination with a pressure regulating valve designed to control the pressure of oil and to allow the excess of oil to overflow past the valve, and means for conveying the oil under pressure to the engine bearings and the overflow oil to the space S and SS to cool the cylinder and lubricate the mechanism substantially as described.

4. In an internal combustion engine, the cylinder C the inserted head 4, the rings 6, the nut and screw 9, the rigid plate B, the cross piece 10, and bolts 12, the valve 5, ports in the said cylinder C, head 4, and valve 5, for the intake and exhaust of gas and means for rotating the valve, in combination with the extension piece 8 between the head 4 and cross piece 10 substantially as described.

JOHN A. TOOMEY.

Witnesses:
O. HAZEN,
HERBERT QUINN.